Feb. 14, 1928.

W. WINSLOW 1,659,288

THRASHING MACHINE WEIGHING APPARATUS

Filed May 31, 1927

Inventor:
William Winslow
By A. Miller Beefield
Atty

Patented Feb. 14, 1928.

1,659,288

UNITED STATES PATENT OFFICE.

WILLIAM WINSLOW, OF FAIRBURY, ILLINOIS.

THRASHING-MACHINE WEIGHING APPARATUS.

Application filed May 31, 1927. Serial No. 195,374.

My invention relates to weighing apparatus, and particularly to weighing apparatus for thrashing machines.

One of the objects of the invention is to provide a simple, practical and advantageous form of weighing machine.

Another object of the invention is to arrange for accurate adjustment of the weighing apparatus so that the grain being weighed by the machine will be accurately weighed.

Another object of the invention is to permit the ready adjustment of the apparatus so that it may be accurately adjusted to properly weigh different qualities or kinds of grain.

In the accompanying drawings.

Figure 1:
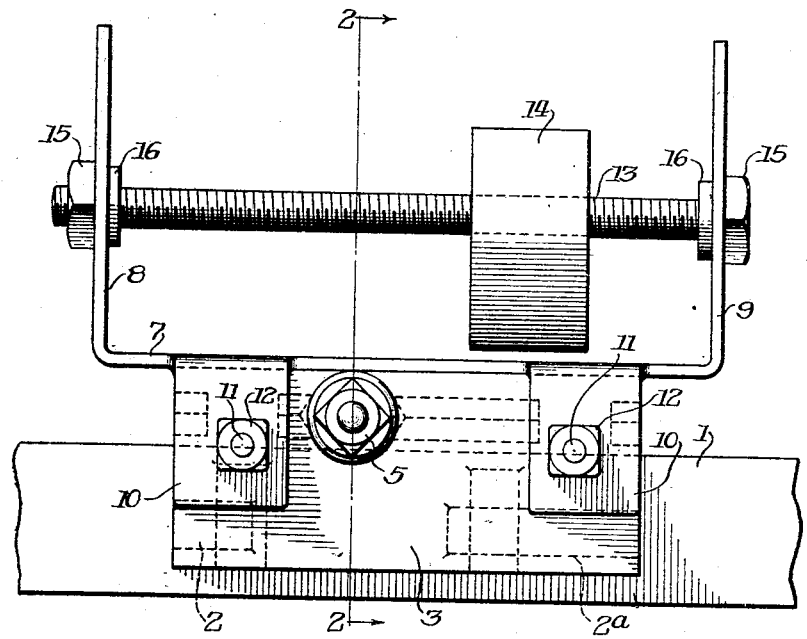
Fig. 1 is a side elevation of a portion of a weighing machine embodying my invention.

Referring to the drawings, I show the weighing apparatus applied to a thrashing machine, although it will be understood that it can be applied to other types or kinds of machines.

In the drawings, 1 represents a substantially horizontally arranged bar or beam which will be called the weighing bar or beam. This is suitably mounted in the machine so as to counterbalance or weigh the grain. On this bar or beam 1 is mounted a weight 2, which is made longitudinally adjustable on the beam 1, so as to counterbalance the grain so that the right amount will be measured out by weight. This weight 2 preferably consists of two parts, 2ª and 3, mounted on opposite sides of the beam 1, and held together by a bolt 4 passing through the parts 2 and 3 and having one end provided with a nut 5 by which the two parts 2ª and 3 may be drawn sufficiently tight to hold them in position on the bar or beam 1.

On this weight 2 is a counterbalance attachment, preferably consisting of a member 7, such as a metal strap or piece, with its opposite ends bent up to form side supports or uprights 8 and 9. This member 7 may be secured to the weight 2 in any preferred way but is preferably attached by means of downwardly extending lugs 10, preferably made integral with the base portion of the strap 7, bolts 11 passing through the portion 3 of the weight 2 and being provided with nuts 12.

A supplemental weight carrying beam or bar 13 is extended between the uprights 8 and 9 and supported by the same and in turn carries a supplemental and an adjustable weight 14. The beam 13 is preferably in the form of a screw threaded bar or rod and has its ends secured to the uprights 8 and 9 by means of nuts 15 and 16, whereby said beam 13 is securely held in position.

Figure 2:
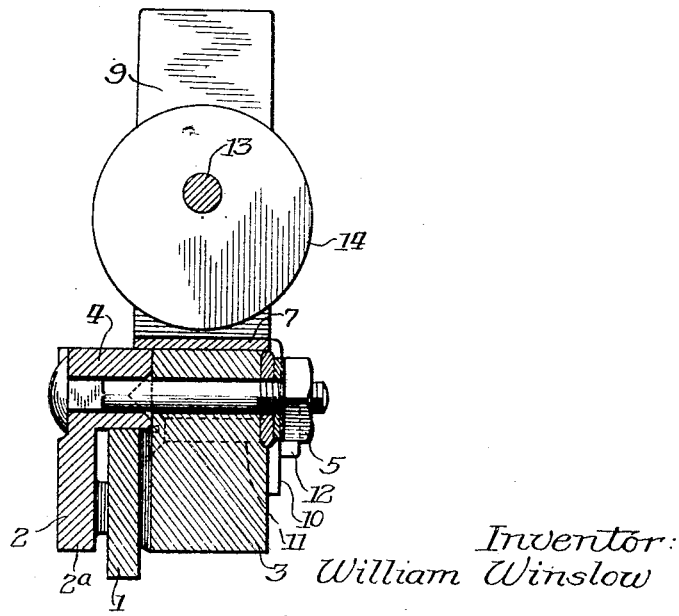
Fig. 2 is a cross-section taken on line 2—2 in Fig. 1.

The weight 14 is screw threaded so as to permit it to be adjusted along the beam 13 by turning or rotating it thereon, the extent of adjustment of the weight 14 on bar 13 being evidently capable of being very accurately made and also of being made in very small or moderate amounts, so as to secure readily and quickly an accurate weighing adjustment. Furthermore, this weight 14 is preferably mounted in an eccentric manner on bar 13 (as shown in Fig. 2), so that said weight 14 will remain in the position to which it is adjusted and will not turn on bar 13 after being once adjusted so as to change or spoil the adjustment.

Thus it will be seen that the weight 2 may be readily adjusted to the general position desired on beam 1, and then the nut 5 may be tightened sufficiently to hold said weight 2 in such adjusted position. Then, for further and more accurate adjustment, the weight 14 will be manipulated, this weight being turned on bar 13 to any desired extent. This adjustment will be accurately and quickly made and without changing the adjustment of weight 2 and without taking down or interfering with the efficiency of the machine on which the weighing apparatus is mounted. Furthermore, the jolting and shaking of the machine and of this weighing attachment will not have any result in changing the position of weight 14, because of the eccentric mounting of that weight, the weight remaining in position and not turning even though very considerably shaken.

It will be understood that changes and modifications may be made without departing from the spirit of the invention.

What I claim as my invention is:

1. A weighing attachment comprising a weighing beam or bar and a weight adjustably mounted thereon and a supplemental weight carried by a supplemental weighing beam or bar, said supplemental weight being eccentrically mounted on said supplemental beam or bar.

2. A weighing attachment comprising a weighing beam carrying an adjustably mounted weight and a threaded supplemental beam carried by said weight and provided with a rotatably threaded supplemental weight, said supplemental weight being eccentrically mounted on said threaded supplemental beam.

3. A weighing apparatus comprising a weighing beam or bar, a weight adjustably mounted thereon and provided with means for clamping it in adjustment on said beam or bar, a strap detachably mounted on said weight and having upwardly extending end portions providing uprights, a supplemental weighing beam or bar extended between and supported by said uprights, and a supplemental weight carried by said supplemental beam and adjustable along the same, said strap being adjustably mounted on said first mentioned weight by means of bolts carried by said weight and detachably engaging said strap.

4. A weighing apparatus comprising a weighing beam or bar, a weight adjustably mounted thereon, a strap detachably mounted on said weight, said strap being provided with projecting integrally formed lugs, bolts passing through said lugs and into said weight for detachably holding the strap in position, a supplemental weighing bar carried by said strap, and a supplemental weight carried by said supplemental weighing bar.

5. A weighing apparatus comprising a weighing beam or bar, a weight adjustably mounted thereon, a strap detachably mounted on said weight, said strap being provided with projecting integrally formed lugs, bolts passing through said lugs and into said weight for detachably holding the strap in position, a supplemental weighing bar carried by said strap, and a supplemental weight carried by said supplemental weighing bar, said supplemental weighing bar being screw threaded and said supplemental weight being also threaded so as to permit adjustment along said bar by turning.

6. A weighing apparatus comprising a weighing beam or bar, a weight adjustably mounted thereon, a strap detachably mounted on said weight, said strap being provided with projecting integrally formed lugs, bolts passing through said lugs and into said weight for detachably holding the strap in position, a supplemental weighing bar carried by said strap, and a supplemental weight carried by said supplemental weighing bar, said supplemental weighing bar being screw threaded and said supplemental weight being also threaded so as to permit adjustment along said bar by turning, said supplemental weight being constructed so as to be unbalanced with more weight on one side of its point of support than on the other side, whereby it will be prevented from rotating by shaking of the apparatus.

In witness whereof, I hereunto subscribe my name this 21st day of May, A. D., 1927.

WILLIAM WINSLOW.